United States Patent [19]
Grant

[11] Patent Number: 4,847,901
[45] Date of Patent: * Jul. 11, 1989

[54] TELEPHONE MAGNIFIER ATTACHMENT

[76] Inventor: Alan H. Grant, 3208 Woodhollow Dr., Chevy Chase, Md. 20815

[*] Notice: The portion of the term of this patent subsequent to Aug. 16, 2005 has been disclaimed.

[21] Appl. No.: 232,455

[22] Filed: Aug. 15, 1988

Related U.S. Application Data

[63] Continuation-in-part of Ser. No. 15,065, Feb. 17, 1987, Pat. No. 4,764,958.

[51] Int. Cl.$^4$ .......................... H04R 1/21; G02B 7/02
[52] U.S. Cl. .................................. 379/450; 350/243; 379/441
[58] Field of Search ............... 379/450, 447, 428, 433, 379/441, 457; 350/243

[56] References Cited

U.S. PATENT DOCUMENTS

| | | | |
|---|---|---|---|
| 1,508,434 | 9/1924 | Ayres | 379/447 |
| 1,762,809 | 6/1930 | Bradford | 379/450 |
| 1,971,519 | 8/1934 | Bradford | 379/447 |
| 2,991,334 | 7/1961 | Wandel | 379/449 |
| 3,651,285 | 3/1972 | Tomaiuolo | 379/447 |
| 4,354,063 | 10/1982 | Kuka | 379/433 |
| 4,764,958 | 8/1988 | Grant | 379/450 |

FOREIGN PATENT DOCUMENTS 57-99852  6/1982  Japan .................................. 379/447

Primary Examiner—Jin F. Ng
Assistant Examiner—Danita R. Byrd
Attorney, Agent, or Firm—Berman, Aisenberg & Platt

[57] ABSTRACT

An attachment for a telephone comprises a block in the form of a wedge for securing two lenses to the rear surface of the telephone handset. The lenses are arranged such that the user of the handset can look through one of the lenses when the handset is held in either hand.

10 Claims, 1 Drawing Sheet

TELEPHONE MAGNIFIER ATTACHMENT

CROSS REFERENCE TO RELATED APPLICATION

This application is a continuation-in-part of application No. 015,065, now U.S. Pat. No. 4,764,958.

TECHNICAL FIELD

This invention relates to the art of attachments for telephone receivers. In particular, the invention is a device for attaching a magnifying lens to a telephone handset for assisting the vision of the person using the telephone.

BACKGROUND ART

My prior application, Ser. No. 015,065 (now U.S. Pat. No. 4,764,958) disclosed a device for attaching a magnifying lens to a handset wherein the handset generally contemplated was of the type having a mouthpiece cover screwed onto the base of the handset, thus providing a groove between these parts. The preferred attachment fit in this groove to secure a lens to the handset. In one embodiment, an engagement means having a socket was secured to the handset, and a projection on a lens frame extended into the socket. The disclosure of my prior application is incorporated by reference.

Other attachments for telephones were cited in the prior application, and reference is made to that application for a discussion of those citations.

SUMMARY OF THE INVENTION

There are a wide diversity of telephone handsets in use today. Many of these do not have a mouthpiece cover as a separate element, and the preferred attachment disclosed in my previous application might not be easily used with these handsets.

In accordance with my present invention, a mounting element is provided which is easily attached, for example, by adhesive to the rear surface of the handset. The mounting element is preferably a block of resilient material which is used to provide an angle with respect to the handset such that the lenses of the magnifier attachment are perpendicular to the user's line of sight when the handset is in use. In one embodiment, the block has a slot to receive a central portion of a frame which supports two magnifying lens elements, each of which extends to a respective side of the handset. This arrangement of lenses allows the user to look through one of the lenses even if the handset is held in either hand.

The block may, however, have any of various means for securing the lenses. For example, the lenses frame may be cemented to the block, or mounting pins may extend outward from the block through holes in the frame.

It is an object of this invention to provide a telephone handset with a pair of lenses mounted at an angle which permits viewing by a user through either lens.

Another object of this invention is to provide a telephone handset wherein a mounting wedge is used to support a frame having two lenses in an orientation wherein the user may view through either lens.

DETAILED DESCRIPTION OF THE PREFERRED EMBODIMENT

Figure 1:
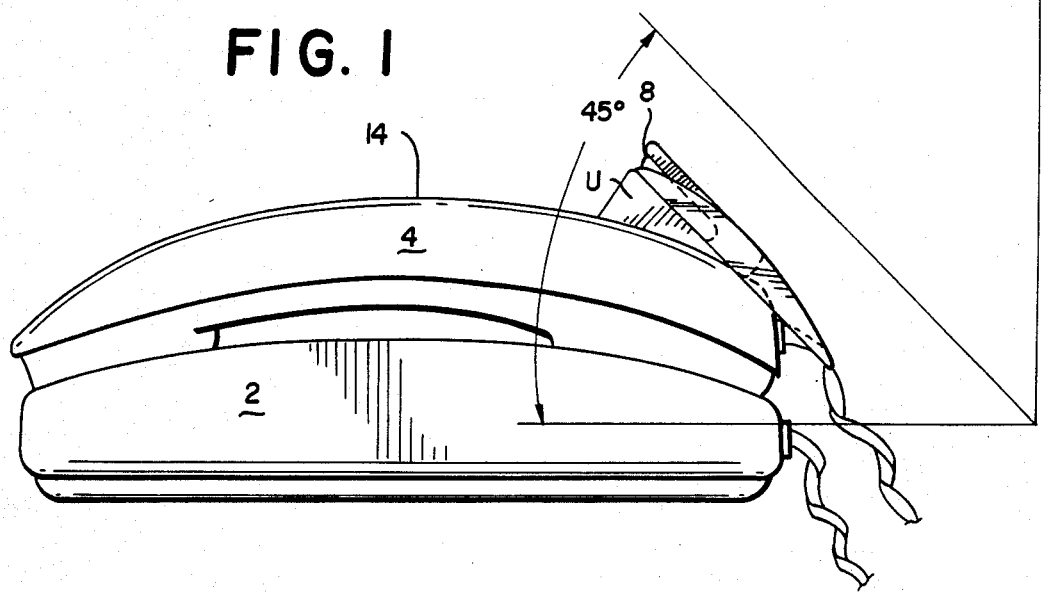
FIG. 1 is a side view of a telephone having the attachment of the invention secured thereto.

FIG. 1 shows a telephone having a base 2 and a handset 4. Attached to the handset is a mounting block 6 which secures a frame 8 holding two lenses to the handset. The preferred angle between the plane of the lenses and the plane containing the outer ends of the earphone and the microphone is approximately forty five degrees. Accordingly, the mounting block 6 provides an angle which, when added to the angle provided by the rear surface of the handset, results in placing the lenses at the proper angle. The proper angle is such that the lenses are perpendicular to the line of sight of the user when the user is holding the handset in normal use.

Figure 2:
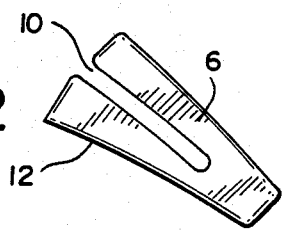
FIG. 2 is a side view of a mounting element in accordance with the invention.

FIG. 2 is a side view of one embodiment of the mounting block 6. A slot 10 extends into the block for receiving a frame which supports the lenses. As noted above, other means are possible for securing the frame to the block. Lower surface 12 of block 6 is preferably shaped to conform to the shape of the rear surface 14 of the handset. As noted above, the angle provided by the block 6 must supply part of the angle at which the lenses are to be held, the remainder being provided by the handset itself. In practice, the angle supplied by the block is 15–25 degrees.

Figure 3:
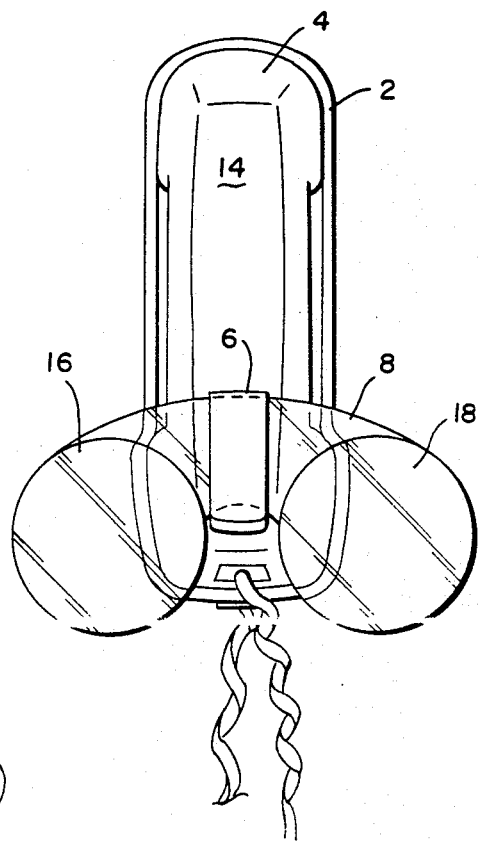
FIG. 3 is a top view of the telephone shown in FIG. 1.

FIG. 3 is a top view of the telephone of FIG. 1 and shows how the two lenses 16 and 18 are held in a frame which is in turn secured to the block 6 in the manner which has been described above. The frame may be of several different types. A preferred frame is of plastic and provides a circular mounting element for each of the lenses. The central par of the frame is adapted to be received by the block and spaces the lenses by a distance adequate to align the lenses with the line of sight of the user. Spacing the optical axes of the lenses 16 and 18 by about 8–11 cm. has been found to be appropriate. The preferred spacing is about 9 cm.

The angles referred to above are measured in a longitudinal plane of the handset. It is often desired to curve the frame slightly such that the lenses are not coplanar to comfortably position the lenses in front of the user.

Figure 4:
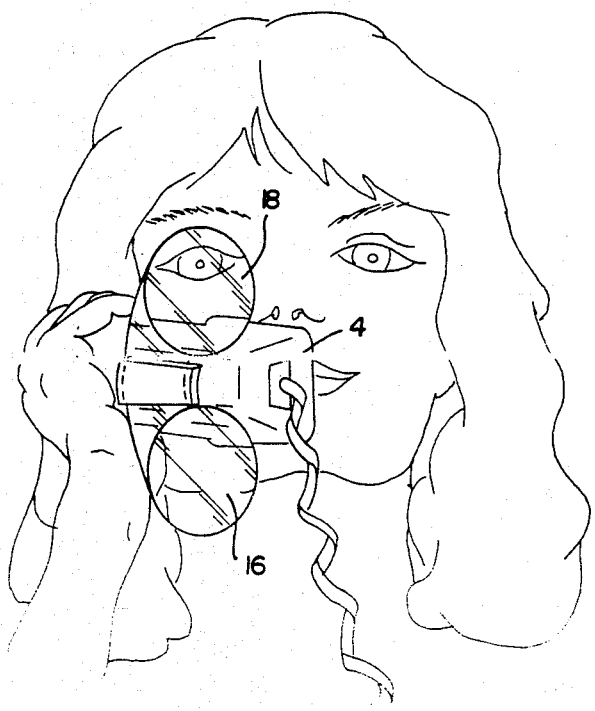
FIG. 4 is a front view of a user holding a telephone handset having an attachment in accordance with the invention.

FIG. 4 shows the invention in use. The user is looking through lens 16, while lens 18 is not in use. It will be appreciated that lens 18 would be positioned for use if the handset 4 were held by the user in the left hand. The arrangement whereby two lenses are held to the handset in the proper orientation allows the user to look through a lens when the handset is held in either hand.

Modifications within the scope of the appended claims will be apparent to those of skill in the art.

I claim:

1. An attachment for a telephone comprising support means for supporting lens means in a position whereby the user of the telephone may look through said lens means when using the handset, said support means comprising means for being attached to the rear surface of a handset of said telephone and means for engaging said lens means, wherein said means for engaging said lens means is adapted to provide a predetermined angular relationship between said rear surface and said lens means.

2. An attachment according to claim 1 wherein said lens means comprises at least one lens and a frame holding said lens, and said support means is a block having means for receiving said frame.

3. An attachment according to claim 2 wherein said means for receiving said frame is a slot in said block.

4. An attachment according to claim 2 wherein predetermined angular relationship is 15-25 degrees.

5. An attachment according to claim 2 wherein said lens means comprises two laterally spaced lenses and said frame comprises a central part between said lenses, and wherein said central portion is received by said block whereby one of said lenses is on one side of said handset and the other of said lenses is on an opposed side of said handset.

6. Optical apparatus in combination with a telephone handset, said optical apparatus comprising a frame and two spaced lenses, said frame having means supporting said lenses side by side and having a central portion attached to a rear surface of said telephone handset.

7. A combination according to claim 6 wherein said central portion comprises a flat surface.

8. A combination according to claim 6 further comprising means for supporting said frame at an angle with respect to said rear surface.

9. A combination according to claim 8 wherein said means for supporting is a block having one surface attached to said rear surface of said handset.

10. A combination according to claim 9 wherein said block provides an angular relationship with respect to said handset such that the lenses are held at an angle of about forty five degrees with respect to a plane intersecting outer portions of the mouthpiece and the earphone of said handset.

* * * * *